May 7, 1963 C. A. LYLE 3,088,519
ROTOR CONSTRUCTION
Filed Sept. 9, 1958

INVENTOR
Charles A. Lyle
By Wayne Lang
AGENT

United States Patent Office 3,088,519
Patented May 7, 1963

3,088,519
ROTOR CONSTRUCTION
Charles A. Lyle, Wellsville, N.Y., assignor to The Air Preheater Corporation, New York, N.Y., a corporation of New York
Filed Sept. 9, 1958, Ser. No. 759,890
3 Claims. (Cl. 165—10)

This invention relates to rotary regenerative heat exchange apparatus and particularly to a rotor arrangement for such apparatus that is sectorially divided by partitions that are adapted to substantially preclude distortion of the rotor from thermal stresses therein.

In regenerative heat exchange apparatus a rotor consisting of a cylindrical matrix rotates within a casing through which both hot exhaust gases and cool compressed air for combustion are directed in a spaced relationship. Passageways through the casing carrying the hot exhaust gases and cooler air for combustion are separated by circumferential sealing means extending around the periphery of the rotor and by radial sealing means that contact the edges of the radial partitions that divide the rotor into a series of sector shaped segments. The hot gases in passing through the rotor give up their heat to the matrix in that part of the rotor so that as the rotor rotates about its axis the heated matrix passes to the cold side where the heat of the matrix is transferred to the cold air flowing therethrough.

In such heat exchange apparatus the length of the fluid passageway through the heat absorbing matrix may be relatively small, however the temperature gradient of the fluid flowing therethrough is the full difference between the temperature of the hot gas and the cool combustion air whereby opposite sides of the matrix are subjected to significant differences of thermal expansion. These differences of thermal expansion produce distortion or warping to the extent that a close tolerance between sealing surfaces that are aligned along the length and circumference of the rotor is impossible to maintain.

It is therefore a major objective of this invention to provide a diaphragm structure for a rotary regenerative heat exchanger or the like that permits thermal deformation of the rotor without the attendant distortion of the sealing surfaces associated therewith.

The invention will be best understood upon consideration of the following detailed description of an embodiment thereof when read in conjunction with the accompanying drawings in which.

Figure 1:
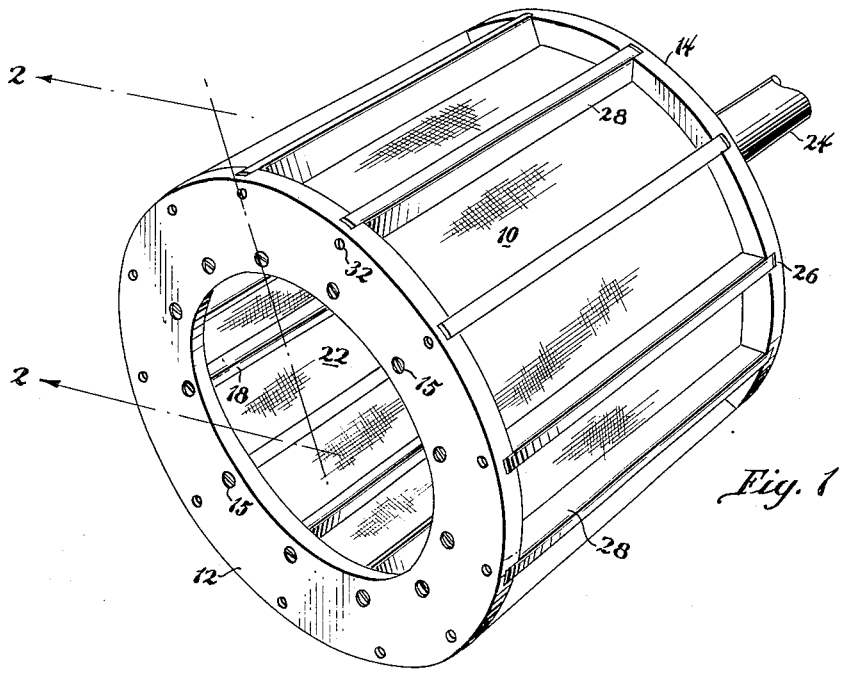
FIGURE 1 is a perspective view of a drum type matrix including an expansible diaphragm means in accordance with my invention.
Figure 2:
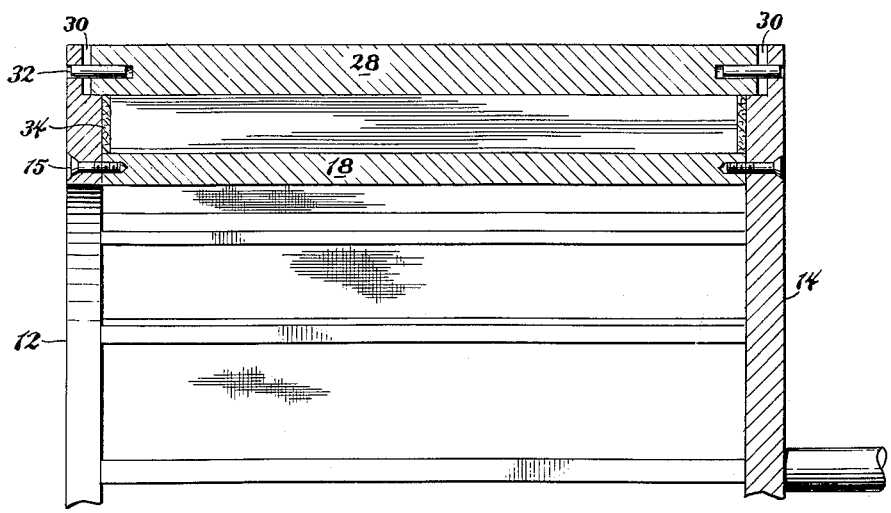
FIGURE 2 is a transverse section of a rotor according to this invention as seen from line 2—2 of FIGURE 1.

In carrying the invention into effect in the form illustrated, a matrix 10 in the form of a drum is adapted to permit the radial flow of a hot exhaust gas and cool combustion air simultaneously through spaced portions thereof. The matrix is enclosed in a skeleton framework of end plates and axially disposed bars that are free to thermally expand or contract without subjecting the entire assembly to the thermal distortion that usually accompanies unequal expansion of spaced parts of an integral body.

As a basis for the rotor framework, two end plates 12 and 14 are provided at opposite ends of the matrix to support a series of circumferentially spaced diaphragm bars 18 that extend axially therebetween. The ends of bars 18 are connected firmly as by screws 15 to the adjacent end plates 12 and 14, the end plate 12 at one end of the matrix being annular to permit the flow of fluid therethrough to interior chamber 22 while end plate 14 is imperforate to provide an end wall for the chamber 22 whereby fluid entering the opening in annular plate 12 is forced radially outward by end plate 14 through the annular matrix. The assembly of end plates 12 and 14 with diaphragm bars therebetween thus provides a reel-like framework on which a length of screen or other perforate material is continuously wound or otherwise applied until the accumulated thickness thereof provides a mass of predetermined heat capacity.

Each end plate 12 and 14 is provided with a series of slots 26 in radial alignment with the ends of diaphragm bars 18 on the opposite side of the matrix. The slots 26 extend radially inward from the peripheral edge of the end plates to the matrix and are adapted to slidably receive the ends of diaphragm bars 28, the aligned diaphragm bars 18 and 28 together forming a split diaphragm with the annular matrix therebetween. Relative axial expansion between the bars 18 and 28 is permitted by means of the spacing 30 normally provided at the end of bars 18 or 28 whereby substantial relative expansion is permitted before the ends of the bars 28 abut the ends of their respective slots.

The radial dimension of the bars 28 corresponds to the radial depth of slots 26 in the end plates 12 and 14 whereby the circumferential outer edge of each bar 28 is maintained in substantial axial alignment with the periphery of the end plates. A pin 32 extends axially from each slot 26 into mating relationship with an axially aligned opening in opposite ends of each bar 28 to provide a sliding fit assuring that each bar 28 will maintain its predetermined axial relationship throughout a wide range of expansion and contraction thereof.

An annular gasket 34 adjacent each end of the matrix 10 is adapted to restrain the matrix from lateral movement while it simultaneously precludes fluid flow therearound.

In operating a device of the type herein defined it may be assumed that in one half of the drum a hot fluid is directed radially inward while in the other half a relatively cool fluid is directed radially outward through the heat absorbent matrix whereby the outer matrix layers and the adjacent bars 28 will be at a considerably higher temperature than the inner layers of the matrix and the inner bars 18. Since the drum is rotated about the shaft 24 by a prime mover not here illustrated, there is a tendency for the entire series of outer bars 28 to expand more than the inner bars 18 but due to the expansion space 26 at the end of each outer bar, each bar is free to expand considerably without distortion of the rotor and the sealing surfaces that may be affixed thereto.

In practice a reverse arrangement may be desired where the inner diaphragm bars 18 are slidably held in slots while the outer bars 28 are firmly connected to their respective end plates. Furthermore, the direction of fluid flow through the rotor may be varied according to any predetermined arrangement without departing from the spirit of the invention, and it is intended that all matter contained in the above description or shown in the accompanying drawings shall be interpreted as illustrative only and not in a limiting sense.

What I claim is:
1. A rotor for a regenerative heat exchanger comprising an imperforate circular end plate and an axially aligned annular end plate arranged in spaced parallel planes; a first series of uniformly spaced diaphragm bars fixedly secured at opposite ends to the annular end plate and the circular end plate to provide therewith a reel-like framework; a continuous annular heat absorbent matrix carried by said framework having radial perforations that permit the flow of gas and air therethrough; an annular gasket between each end of said annular matrix and its adjacent end plate; a second series of uniformly spaced diaphragm bars radially aligned with said first series of diaphragm bars and lying in abutment with an annular surface of said matrix, said second series of diaphragm bars having axially movable connections between their ends and the adjacent end plates to permit axial elongation of said bars without inducing deformation of said framework.

2. A rotor for a rotary regenerative heat exchanger as defined in claim 1 wherein the axially movable connections include slots in the confronting surfaces of said end plates that slidably receive the ends of the second series of diaphragm bars.

3. A rotor for a rotary regenerative heat exchanger as defined in claim 2 wherein the ends of the second series of diaphragm bars are formed with axially directed openings that confront the adjacent end plates, said axially movable connections between the diaphragm bars and the adjacent end plates including pin means that extend axially from each slot into mating engagement with the openings in the ends of said diaphragm bars.

References Cited in the file of this patent

UNITED STATES PATENTS

| | | |
|---|---|---|
| 1,843,252 | Toensfeldt | Feb. 2, 1932 |
| 2,587,252 | Van Weenen et al. | Feb. 26, 1952 |
| 2,615,685 | Bowden et al. | Oct. 28, 1952 |
| 2,789,793 | Theoclitus | Apr. 23, 1957 |
| 2,978,227 | Hess | Apr. 4, 1961 |

FOREIGN PATENTS

| | | |
|---|---|---|
| 738,058 | Great Britain | Oct. 5, 1955 |
| 790,270 | Great Britain | Feb. 5, 1958 |